US009892275B2

(12) United States Patent
Gupta et al.

(10) Patent No.: US 9,892,275 B2
(45) Date of Patent: Feb. 13, 2018

(54) DATA ENCRYPTION IN A MULTI-TENANT CLOUD ENVIRONMENT

(71) Applicant: SAP SE, Walldorf (DE)

(72) Inventors: Vipul Gupta, Bangalore (IN); Balaji Raghunathan, Bangalore (IN); Darpan Dinker, Fremont, CA (US)

(73) Assignee: SAP SE, Walldorf (DE)

( * ) Notice: Subject to any disclaimer, the term of this patent is extended or adjusted under 35 U.S.C. 154(b) by 145 days.

(21) Appl. No.: 15/067,164

(22) Filed: Mar. 10, 2016

(65) Prior Publication Data

US 2017/0262645 A1 Sep. 14, 2017

(51) Int. Cl.
*G06F 21/62* (2013.01)
*G06F 21/60* (2013.01)
*G06F 21/10* (2013.01)

(52) U.S. Cl.
CPC ........ *G06F 21/6218* (2013.01); *G06F 21/602* (2013.01); *G06F 21/10* (2013.01); *G06F 2221/2107* (2013.01)

(58) Field of Classification Search
CPC .. G06F 21/10; G06F 21/6209; G06F 21/6218; G06F 2221/2107
USPC .......................................... 713/165
See application file for complete search history.

(56) References Cited

U.S. PATENT DOCUMENTS

| 5,742,686 | A | * | 4/1998 | Finley | G06F 21/602 380/28 |
|---|---|---|---|---|---|
| 5,987,139 | A | * | 11/1999 | Bodin | H04W 12/02 380/261 |
| 7,324,648 | B1 | * | 1/2008 | Deaver | H04N 5/913 380/225 |
| 8,006,307 | B1 | * | 8/2011 | Klebe | H04L 9/00 726/26 |
| 2006/0034459 | A1 | * | 2/2006 | Uchikawa | G06F 21/6209 380/255 |
| 2016/0253519 | A1 | * | 9/2016 | Broumas | G06F 21/6245 713/189 |
| 2016/0294784 | A1 | * | 10/2016 | Hopkins | H04L 63/0428 |
| 2016/0337320 | A1 | * | 11/2016 | Mason | H04L 63/0428 |
| 2017/0006064 | A1 | * | 1/2017 | Agarwal | H04L 9/3263 |
| 2017/0201526 | A1 | * | 7/2017 | Yehuda | H04L 63/102 |

* cited by examiner

*Primary Examiner* — Hadi Armouche
*Assistant Examiner* — Shahriar Zarrineh (57) ABSTRACT

Various embodiments of systems, computer program products, and methods for encrypting data in a multi-tenant cloud environment are described herein. In an aspect, an encryption time frame to encrypt data associated with a user in a multi-tenant cloud environment may be retrieved. Based on the encryption time frame, a list of object types to be encrypted may be identified. A batch encryption period may be determined for encrypting data corresponding to the list of object types. Further, batches are sequentially selected based on the batch encryption period, for a selected batch: one or more data records may be retrieved based on the batch encryption period and the one or more data records may be encrypted in groups based on at least one throttling value.

14 Claims, 6 Drawing Sheets

```xml
<cluster-root name="com.object.ObjectType1">
    <field name="name" type="String"/>
    <field name="address" type="com.object.ObjectType1"/>
    <field name="phone" type="com.object.Phone"/>
</cluster-root>
<cluster-root name="com.object.Address">
    <field name="ApartmentName" type="String"/>
    <field name="RoadName" type="String"/>
    <field name="PinCode" type="Integer"/>
</cluster-root>
<cluster-root name="com.object.Phone">
    <field name="Country" type="String"/>
    <field name="City" type="String"/>
    <field name="Number" type="Integer"/>
</cluster-root>
```

FIG. 4A

```java
public class Object {
    String ObjectId;
    String name;
    Address address;
    Phone phone;
} public class Address {
    String addressId;
    String apartmentName;
    String roadName;
    Integer pinCode;
} public class Phone {
    String phoneId;
    String country;
    String city;
    Integer number;
}
```

FIG. 4B

```
Table ObjectTab {
    ObjectId varchar2(25) primary key;
    name varchar2(255) ;
    addressId int(11);
    phoneId  int(11);
}

Table AddressTab {
    addressId varchar2(25) primary key;
    apartmentName varchar2(255) ;
    roadName varchar2(255) ;
    pinCode int(9);
}

Table PhoneTab {
    phoneId  varchar2(25) primary key;
    country varchar2(255) ;
    city varchar2(255) ;
    number int(10);
}
```

DATA ENCRYPTION IN A MULTI-TENANT CLOUD ENVIRONMENT

TECHNICAL FIELD

The field generally relates to encryption of data.

BACKGROUND

In multi-tenant cloud computing (e.g., an internet-based computing), resources, data and information can be shared and provided on-demand. Thereby, the cloud computing and storage solutions may provide multiple users with various capabilities to store and process the data. With the cloud computing expanding rapidly with a wide range of complex applications and multiple users, the assurance of safety, integrity and privacy of user information (i.e., data security) can be a concern as private data is stored on a public server that may be prone to attacks. Although cloud storage services may implement security measures such as encrypting real time data, encrypting stored historical data may affect the performance of a system. Encrypting the historical data may require or consume central processing unit (CPU), which may result in system down time.

SUMMARY

Various embodiments of systems, computer program products, and methods for encrypting data in a multi-tenant cloud environment are described herein. In an aspect, an encryption time frame to encrypt data associated with a user in the multi-tenant cloud environment may be retrieved. Based on the encryption time frame, a list of object types to be encrypted may be identified. A batch encryption period may be determined for encrypting data corresponding to the list of object types. Further, batches may be sequentially selected based on the batch encryption period. For a selected batch, one or more data records may be retrieved based on the batch encryption period and the one or more data records may be encrypted in groups based on at least one throttling value.

The above methods, apparatus, and computer program products may, in some implementations, further include one or more of the following features.

The at least one throttling value may include at least one of a group size and a sleep time. The group size and the sleep time may be determined by receiving a plurality of pre-defined throttling values for encrypting the one or more data records corresponding to the batch and determining whether the encryption is a first run.

When the encryption is the first run, default throttling values from the plurality of pre-defined throttling values of the group size and the sleep time may be rendered for encrypting the one or more data records in the first run.

When the encryption is a subsequent run, the group size and the sleep time may be determined based on the pre-defined plurality of throttling values and current system load factors.

The current system load factors may include at least one of time taken for encrypting the one or more data records of a previous group, a central processing unit (CPU) load during encrypting the one or more data records of the previous group and a memory load.

These and other benefits and features of various embodiments will be apparent upon consideration of the following detailed description of embodiments thereof, presented in connection with the following drawings.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DETAILED DESCRIPTION

Embodiments of techniques to provide data encryption in a multi-tenant cloud environment are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted.

In this document, various computer-implemented methods, processes and procedures are described. It is to be understood that the various actions (determining, identifying, receiving, storing, retrieving, and so on) may be performed by a hardware device (e.g., computing system), even if the action may be authorized, initiated or triggered by a user, or even if the hardware device is controlled by a computer program, software, firmware, and the like. Further, it is to be understood that the hardware device may be operating on data, even if the data may represent concepts or real-world objects, thus the explicit labeling as "data" as such may be omitted.

Figure 1:
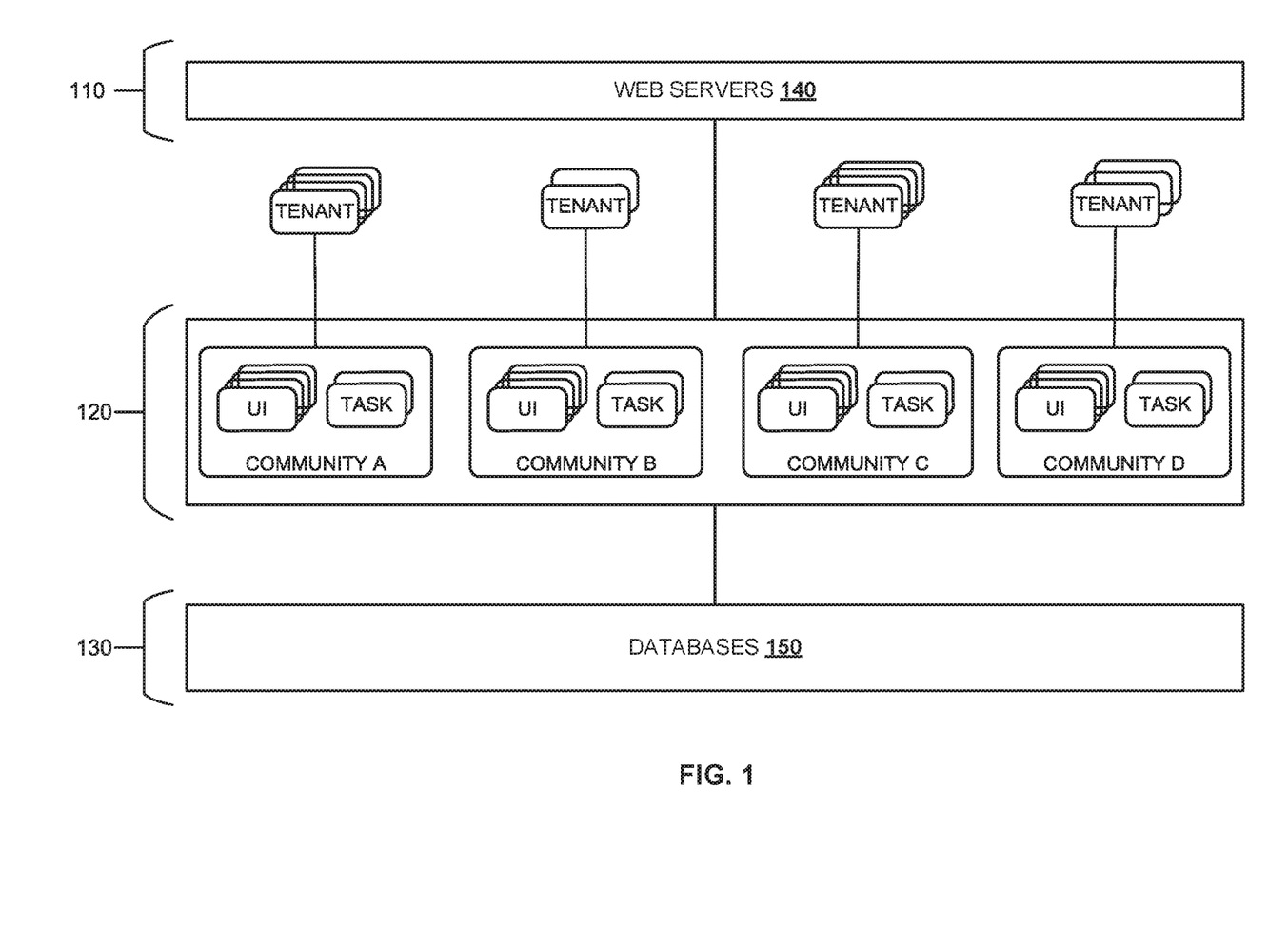
FIG. 1 is a block diagram of a computing environment illustrating an exemplary multi-tenant cloud environment, according to an embodiment.

FIG. 1 is a block diagram of a computing environment illustrating an exemplary multi-tenant cloud environment, according to an embodiment. The multi-tenant cloud environment may provide shared storage platforms and services by supporting different cloud applications running on server architecture with three tiers. For example, the three tiers may be web tier 110, application tier 120 and storage tier 130. The web tier 110 may include one or more web servers (e.g., 140). The web servers 140 may be grouped into several web server farms, which can serve different cloud applications. The users or clients or tenants may be web clients running in a web browser. The users may access the cloud applications over the internet using Hyper Text Transfer Protocol Secure (HTTPS), for instance. Further, the cloud computing may support multi-tenant environment, where the multiple users share resources. For example, multiple users may share same version of the cloud application, same hardware resources, same applications server instances, and same storage. Further, the term "user", "customer", "client" and "tenant" are used interchangeably throughout the document. Also, the term "data" and "data records" are used interchangeably throughout the document.

The application tier 120 may include application cluster running same build of the cloud application. Further, nodes (e.g., user interface (UI) nodes and task nodes in community A to community D) may have different roles, and depending on the role, they may have different functions and may execute different cloud services. Further, each user or tenant may live in one community, for instance. The UI nodes may process web requests. The task nodes may be used to execute the tasks.

The storage tier 130 may include databases (e.g., 150), which may include a transactional database cluster, an analysis database cluster, and an unstructured data storage, for instance. Transactional database servers may store the transactional and other operational data persisted by the cloud applications. In the transactional databases, data records of different users may be stored in a table. A user identifier column may be used to assign the rows to the users. Each cloud application may have respective databases, for example. In the analysis database cluster, the users who have subscribed to the spend analysis solution may have dedicated analysis schemas. In the unstructured data storage, unstructured data such as, but not limited to file attachments, log files, and search indexes, may be stored on file storage systems.

In one example, data represented using an object-oriented programming (OOP) language may be considered for describing a method of encrypting data records in the multi-tenant cloud environment. However, the described process of encryption may be implemented for data supporting other programming languages. The OOP language may be a programming paradigm based on the concept of "objects", which are data structures including data, in the form of fields, which may be referred to as attributes; and code, in the form of procedures, may be referred to as methods. In other words, the data associated with each user may be segregated or grouped into different object types. Further, the object types may include one or more tables storing actual data records.

In one exemplary embodiment, when the user opts-in for encryption, real time data records associated with the user may be encrypted before storing in the storage tier 130. With respect to data records present in the database (e.g., historical data), the data records (e.g., corresponding to the historical data) may be retrieved in batches for encryption based on different throttling values, for instance. The throttling values may be, but not limited to, a number of data records to be encrypted in one run of encryption and values depicting pauses (e.g., sleep time) taken after each run of encryption. Therefore, by encrypting the data records in groups and determining sleep time between two runs of encryption based on a state of the system (e.g., central processing unit (CPU) load), real-time performance of a multi-tenant cloud system may not be affected. Further, the described process may ensure that the user is able to use the data in real-time when the historical data encryption is happening in parallel in the background. Also, the process may not require taking the database off-line for encryption or re-encryption of the data as the process may not affect the performance of the system by not affecting current production loads.

Figure 2:
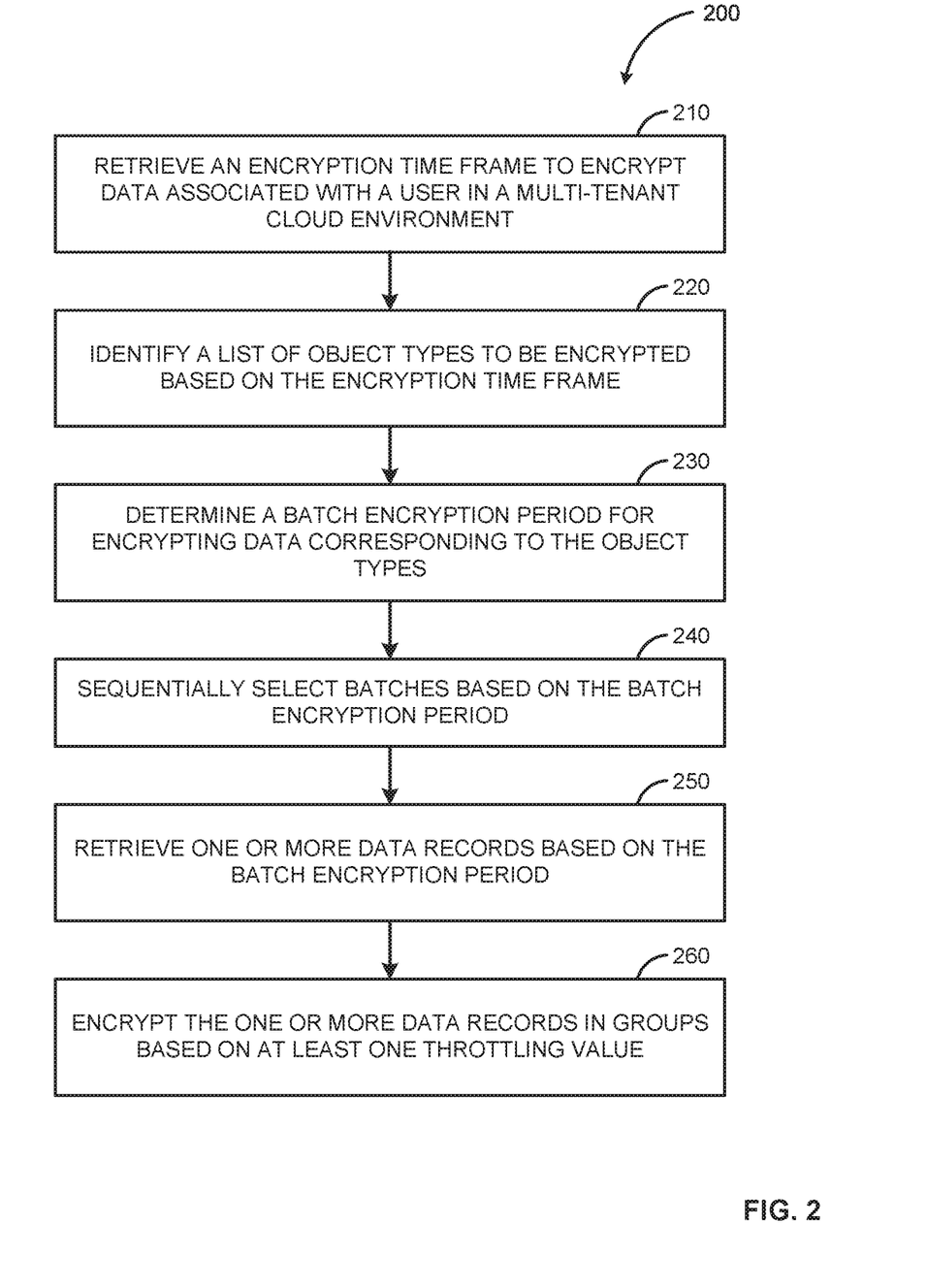
FIG. 2 is a flow diagram illustrating an example process to encrypt data in a multi-tenant cloud environment, according to an embodiment.

FIG. 2 is a flow diagram illustrating example process 200 to encrypt data in a multi-tenant cloud environment, according to an embodiment. Process 200 may be performed by webserver 140. At 210, an encryption time frame to encrypt data associated with a user in a multi-tenant cloud environment may be retrieved from database 150. The encryption time frame may define a time period (e.g., date) from which data associated with the user may be encrypted. Information of the encryption time frame may be stored in a table "user table" as shown in Table 1, for instance.

TABLE 1

| User Identifier | Status of Opt-in for Encryption | Opt-in date | Date from which data to be encrypted |
|---|---|---|---|
| User A | False | Null | Null |
| User X | True | Nov. 26, 2015 | Nov. 27, 2010 |

Table 1 may include details such as "user identifier", which may identify the user or customer by name, for instance, and can be referred to as a primary key. The next column of the Table 1 may indicate "status of opt-in for encryption." For example, when the user does not opt-in for encryption of customer's data, the "status of opt-in for encryption" column may indicate "False" (e.g., user A in Table 1). Similarly, when the user opts-in for encryption of user's data, the "status of opt-in for encryption" column may include "True" (e.g., user X in Table 1). Further, "opt-in date" may include a date on which the user has opted for the encryption. In the example, the opt-in date of user X is Nov. 26, 2015, may be referred as "$Control_{date}$." Another column "date from which data to be encrypted" in the Table 1 may indicate from which date the user's data is to be encrypted (e.g., Nov. 27, 2010 corresponding to the user X), may be referred as "$H_{date}$." Therefore, data encryption process may be initiated by retrieving an input from the user related to the time range for which the user desires their data (e.g., historical data) to be encrypted. For example, from the information available in the Table 1, data associated with the user X from Nov. 27, 2010 may be encrypted.

At 220, a list of object types (e.g., with respect to object oriented programming (OOP) language), associated with the user, to be encrypted based on the encryption time frame may be identified. In one exemplary embodiment, the user may be associated with multiple object types. A check is made to identify the object types which are to be encrypted based on the encryption time frame. For example, a list of the object types associated with the user, which are not encrypted from Nov. 27, 2010 (e.g., date from which data to be encrypted) are listed. Further, the list of the object types may be stored in a table "object type status table" as shown in Table 2, for instance.

TABLE 2

| User Identifier | Object Type Identifier | Data Encrypted from date |
|---|---|---|
| User X | com.object.objecttype1 | Nov. 26, 2015 |

At 230, a batch encryption period for encrypting data corresponding to the object types may be determined. In one exemplary embodiment, the batch encryption period may define a number of batches in which the data is to be encrypted. The batch encryption period may be less than the encryption time frame. The number of batches may be determined based on factors such as, but not limited to the amount of data to be encrypted and the time period of data to be encrypted. For example, the batch encryption period may be "seven days." Further, the data corresponding to every "seven days" may be retrieved for encryption. Thereby, encryption of data (e.g., historical data) may be performed in small batches to maintain performance of a system (e.g., by not overloading the system load).

At 240, batches may be sequentially selected based on the batch encryption period. For example, when the batch encryption period is "seven days", an effective date for which data encryption may be performed can be from "$Control_{date}$" to "$Control_{date}-7$." In the example, first batch may be from Nov. 26, 2015 to Nov. 19, 2015.

At 250, for a selected batch, one or more data records may be retrieved based on the batch encryption period. For example, data associated with the object type "com.object.objecttype1" may be encrypted based on the table "object type status tab" (e.g., Table 3). In one exemplary embodiment, the data records associated with the object type "com.object.objecttype1" may be stored in a table or in multiple tables. In Table 3, a list of tables associated with the object type "com.object.objecttype1" are identified.

TABLE 3

| User Identifier | Object Type Identifier | Table Identifier | Data Encrypted from date |
|---|---|---|---|
| User X | com.object.ObjectType1 | com.object.ObjectType1 | Nov. 26, 2015 |
| User X | com.object.ObjectType1 | com.object.Address | Nov. 26, 2015 |
| User X | com.object.ObjectType1 | com.object.Phone | Nov. 26, 2015 |

In one exemplary embodiment, the list of status tables from "object type table status tab" associated with the object type "com.object.objecttype1" with "data encrypted from date" (e.g., Nov. 26, 2015) may be identified. Further, data records between the date mentioned in "data encrypted from date" (e.g., Nov. 26, 2015) and "$Control_{date}-7$" may be retrieved for encryption (e.g., in a reverse chronological order from the table with latest date to oldest). In one exemplary embodiment, the status tables "object type table" and "object type table status tab" ensure to keep a track of amount of encrypted data and amount of data to be encrypted.

At 260, the one or more data records are encrypted in groups based on one or more throttling values. These throttling values may be determined in accordance with example process 300, as described below with respect to FIG. 3. For example, for each table in the "object type table status table", the process mentioned at 260 may be executed in the date range from "encrypted up to" to "$Control_{date}-7$." In one exemplary embodiment, the throttling values may be, but not limited to a group size (e.g., a number of data records to be encrypted in one run of encryption) and values depicting sleep time between different runs of the encryption (e.g., pauses taken after each run of the encryption). Therefore, the system may take longer pauses during periods of high loads to do the encryption of the historical data without affecting production of the system in real time (e.g., without any down-time required for the encryption process).

Figure 3:
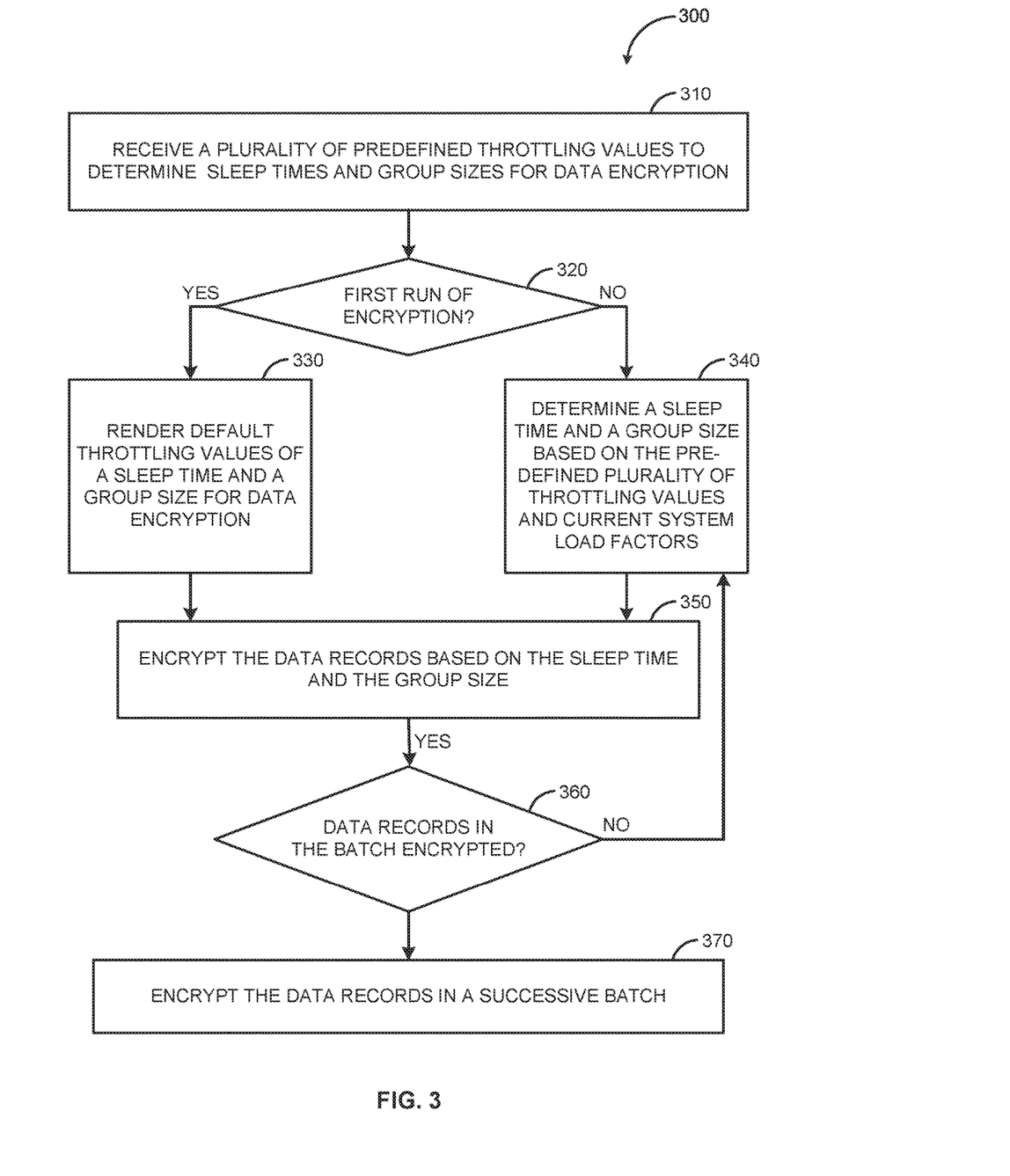
FIG. 3 is a flow diagram illustrating an example process to determine throttling values, according to an embodiment.

FIG. 3 is a flow diagram illustrating example process 300 to determine throttling values, according to an embodiment. Process 300 may be performed by webserver 140. At 310, a plurality of pre-defined throttling values to determine sleep times and group sizes for encrypting data records corresponding to a batch may be received. For example, the batch may include data records associated with the batch encryption period (e.g., 7 days). Further, to encrypt the data records of 7 days, the number of data records corresponding to the seven days are grouped into different groups and then encrypted. In one exemplary embodiment, the pre-defined throttling values may define a group size and sleep time or pauses between two runs of data encryption (i.e., between encrypting the data records of two groups). Table 4 depicts pre-defined throttling values for the group size, for instance. Table 5 depicts pre-defined throttling values for the sleep time, for instance.

TABLE 4

| Group size | Throttling values |
|---|---|
| Minimum group size | 50 |
| Default group size | 250 |
| Maximum group size | 1000 |

TABLE 5

| Sleep time | Throttling values |
|---|---|
| Minimum sleep time | 5 seconds |
| Default sleep time | 10 seconds |
| Maximum sleep time | 60 seconds |

At 320, a check is made to determine whether the encryption is a first time encryption (e.g., a first run or encryption of data records corresponding to first group). When the encryption is taking place for the first time (e.g., first group), default throttling values of the group size and the sleep time are rendered for encryption, at 330. For example, the group size may be 250 and the sleep time may be 10 seconds. Therefore, 250 data records are encrypted in the first run and upon completing encryption of the 250 data records, the encryption process may be paused for 10 seconds. An example code for identifying the throttling values for the first time of data encryption may be as shown in Table 6.

TABLE 6

```
private double runTimeForFirstBatch;
private boolean isFirstRun = true;
private long previousSleepTime = DefaultSleepTime;
private int previousBatchSize = DefaultBatchSize;
```

At 340, when the encryption is taking place for the next time or subsequent run, the group size and the sleep time may be determined based on the pre-defined plurality of throttling values and current system load factors. The current system load factors may be, but not limited to, time taken for encrypting the data records of a previous group, a central processing unit (CPU) load during encryption of the data records of the previous group and a memory load.

An example code for determining the throttling values for subsequent runs of encryption may be as shown in Table 7.

TABLE 7

```
if ((this.isFirstRun) && (batchRunTime > 0.0D)) {
    this.runTimeForFirstBatch = batchRunTime;
    this.isFirstRun = false;
}
final double systemCpuLoad = getSystemCpuLoad( );
final double throttlingFactor =
(batchRunTime / this.runTimeForFirstBatch) *
getCPULoadFactor(systemCpuLoad);
final double sleepTime = DefaultSleepTime * throttlingFactor;
final int batchSize = (int) (DefaultBatchSize / throttlingFactor);
final long calculatedSleepTime = Math.round(sleepTime);
final long sleepTimeForNextRun =
    Math.min(Math.max(calculatedSleepTime, MinSleepTime),
    MaxSleepTime);
final int computedBatchSize =
    Math.min(Math.max(batchSize, MinBatchSize),
    MaxBatchSize);
previousSleepTime = sleepTimeForNextRun;
previousBatchSize = computedBatchSize;
return new ThrottlingData(
    systemCpuLoad * 100,
    batchRunTime,
    calculatedSleepTime,
    sleepTimeForNextRun,
    computedBatchSize);
}
private double getSystemCpuLoad ( )
{
    return OperatingSystemBeanInstance.getSystemCpuLoad( );
}
```

TABLE 7-continued

```
//private double getCPULoadFactor (final double systemCpuLoad)
{
    if (systemCpuLoad > CPU_80_Percent) {
        return 2.0D;
    }
    if (systemCpuLoad > CPU_60_Percent) {
        return 1.5D;
    }
    return 1.0D;
}
```

At 350, the data records are encrypted based on the determined sleep time and the group size at 330 or at 340. Therefore, for each run of encryption, the batch size and the pause time may be determined. For the first run, default values may be considered, and for the subsequent run, the throttling values are determined based on above mentioned example. For example, for the first run, 250 (e.g., default group size) data records are encrypted and the pause time between the first run and the subsequent run may be 10 seconds (e.g., default pause time). Similarly for the subsequent runs, the throttling values can be minimum values or maximum values depending on the status of the system load (i.e., the "systemCpuLoad") as depicted in Table 7. For example, the sleep time may be 60 seconds when the CPU load is 80% and the sleep time may be 5 seconds when the CPU load is 60%.

At 360, a check is made to determine whether the data records in the batch are encrypted. When there are one or more data records in the batch to be encrypted, processing may return to 340.

At 370, when the data records in the batch are encrypted, data records corresponding to next batch are encrypted.

In one exemplary embodiment, the "data encrypted from date" may be updated in the status tables "object type status table" (e.g., Table 8) and "object type table status tab" (e.g., Table 9) upon successful encryption of data records corresponding to each group. In the examples below, Tables 8 and 9 are updated versions of Tables 2 and 3, respectively. Thereby, information regarding data encryption (e.g., date from which the data records are encrypted and date from which remaining data records to be encrypted) can be accessed by the status tables (e.g., Tables 8 and 9), which may assist in tracking the data encryption. An example code to update the status tables may be depicted as in Table 10.

TABLE 8

| User Identifier | Object Type Identifier | Data Encrypted from date |
| --- | --- | --- |
| User X | com.object.objecttype1 | Nov. 27, 2010 |

TABLE 9

| User Identifier | Object Type Identifier | Table Identifier | Data Encrypted from date |
| --- | --- | --- | --- |
| User X | com.object.ObjectType1 | com.object.ObjectType1 | Nov. 27, 2010 |
| User X | com.object.ObjectType1 | com.object.Address | Nov. 27, 2010 |
| User X | com.object.ObjectType1 | com.object.Phone | Nov. 27, 2010 |

TABLE 10

```
List<ClusterRoots> listOfClusterRoots;
Iterate
    List<Tables> listOfClusterRootTables
    Iterate
```

TABLE 10-continued

```
    List<Ids> listOfIdsinBatchesinTable
    Iterate
        "update table set cols = <vals> where id = <id>"
        <batch update> jdbcConnection.updateBatch( )
        Commit; //batch
        TableStatusObject.update( ).commit( );
        lastUpdatedDateForBatch
    End Iterate
    minLastUpdatedDate.
    End Iterate
    ClusterStatusUpdate.update(minLastUpdatedDate).commit( );
EndIterate
```

The process described in FIGS. 2 and 3 depicts when a user opts in for data encryption. However, there can be scenarios where more than one user may opt-in for data encryption at a time in the cloud environment. In one exemplary embodiment, when more than one user opts for data encryption in the in the cloud environment, details of concurrent users opted in for encryption may be considered for the data encryption. The details of concurrent users may include, but not limited to number of users opted in for the data encryption, weights representing an amount of data intended to be encrypted for each user and priority for encrypting the data associated with each user. An example for encrypting data associated with multiple user may be described with an example depicted in Table 11.

TABLE 11

| Users | Status of Opt-in for Encryption | Weights | Priority |
| --- | --- | --- | --- |
| User A | True | 20 | 2 |
| User B | True | 45 | 1 |
| User C | True | 15 | 1 |
| User D | True | 30 | 3 |
| User X | True | 35 | 1 |
| User Y | True | 45 | 4 |
| User Z | True | 10 | 2 |

For example, the data encryption process may be executed by encrypting data corresponding to users having high priority (e.g., priority 1). The priority may be specified by the users, for instance. The priority of User B. User C and User X is high, followed by User A and User Z. Then, User Z is having low priority. In one exemplary embodiment, the data encryption may be based on a threshold weight. The threshold weight may be referred as a maximum weight the system can accommodate for data encryption (e.g., 100) depending on the current system load (e.g., real time production workload). In the example, the "priority 1" users add up to net weight of "95" (e.g., User B "45"+User C "15"+User X "35", which adds to net weight "95", less than to the threshold weight). Thereby, data corresponding to users (e.g., User B, User C and User X) may be encrypted on priority by executing the process described in FIG. 2. Similarly, upon encrypting data associated with "priority 1" users, data associated with next priority users (e.g., "priority 2" users) are considered for encryption.

Figure 4A:
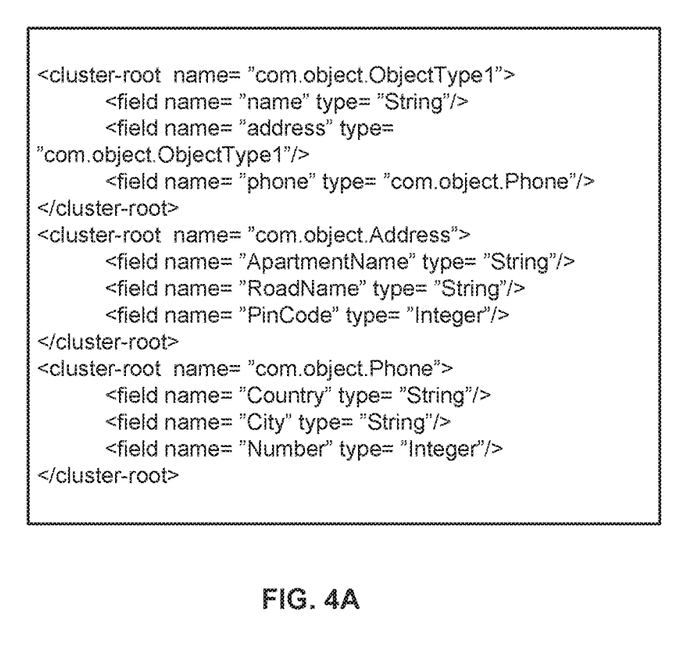
FIG. 4A shows an exemplary Meta structure of an object type, according to an embodiment.

FIG. 4A shows an exemplary metastructure of an object type, according to an embodiment. An object oriented programming (OOP) language may be a programming paradigm based on the concept of "objects." In one example, enterprise applications may use object oriented technology to build cloud applications, and may use a relational database in the backend to store the objects. The relational database may be a collection of data records organized as a set of tables from which data can be accessed. In one exemplary embodiment, object relational mapping to relational database may ensure storing encapsulated objects in tables and storing the references to the tables (e.g., a primary key) in the primary table which may be used to reconstitute the objects.

Figure 4B:
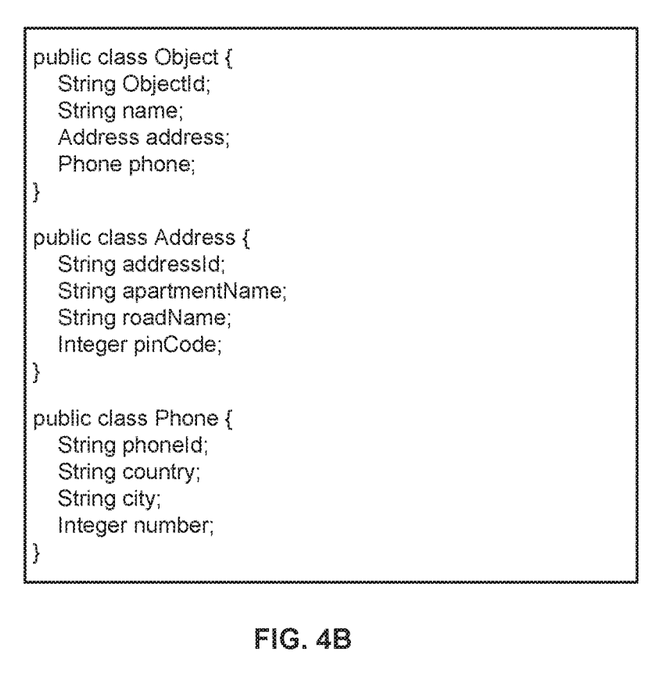
FIG. 4B shows an exemplary class model of an object type "com.object.ObjectType1", according to an embodiment.

FIG. 4B shows an exemplary class model of an object type "com.object.ObjectType1", according to an embodiment. In one exemplary embodiment, when the object type "com.object.ObjectType1" is compiled, the structure may be converted to a class model as shown in FIG. 4B. The class model may show static class objects (e.g., structure) in a system and relationships between them. In one example, classes for each attribute such as, but are not limited to "object", "address" and "phone" are compiled.

Figure 4C:
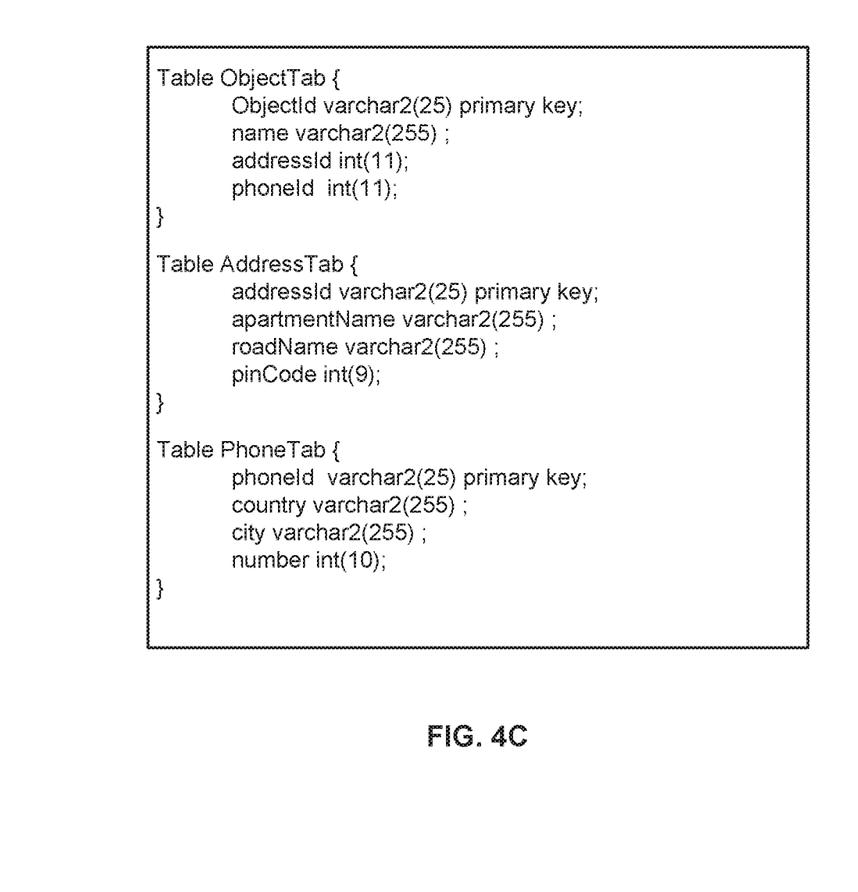
FIG. 4C shows an exemplary relational database structure corresponding to the class model of FIG. 4B, according to an embodiment.

FIG. 4C shows an exemplary relational database structure corresponding to the class model of FIG. 4B, according to an embodiment. The relational database structure may include tables corresponding to the object type "com.object.ObjectType1" such as, but not limited to, "table object", "table address" and "table phone." In one exemplary embodiment, data records corresponding to each table (e.g., "table object", "table address" and "table phone") are encrypted as described in FIGS. 2 and 3. Upon encrypting each of the tables, the object type "com.object.ObjectType1" may be considered as encrypted and the status tables "object type status table" and "object type table status tab" are updated accordingly. Further, the approach of working on tables rather than objects, even though the enterprise application may work at object level, leads to efficiencies in encryption process by working on batches of rows in the database in one go.

The embodiments described herein may prevent taking a database off-line in order to perform encryption or re-encryption of bulk amount of users' data (e.g., historical data), as the process may not affect the performance of the database. Further, when users share a resource, the described process may tune itself to be aware of other real-time and bulk encryption activities in the system. The process may not require additional hardware or mirrored servers solely for replication purposes (e.g., no need to take encryption load off the system to another system). The system tunes and adapts itself to the current workload. Therefore, the system resources may be used in the most optimal manner and the system may not slow down the encryption activity to work either at low rate or during off-peak hours. Zero manual intervention may be required and the system adapts itself to the changing resource utilization in an ongoing basis. Further, the described process may not require to be staged and tested for data sets of different sizes and characteristics. The process may scale and adapt itself to different environments and systems of different sizes, be it large or small. In addition, the encryption process may ensure that the system's performance does not degrade the real-time experience of other users who have not even opted-in, and even the real-time experience of the user who has opted in for the data encryption. Therefore, the embodiments provide an extendable and scalable method of encryption by not segregating the workload into production workload and non-production workloads.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs. DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java. C++, or other object-oriented programming language and development tools. Another embodiment may be implemented in hard-wired circuitry in place of, or in combination with machine readable software instructions.

Figure 5:
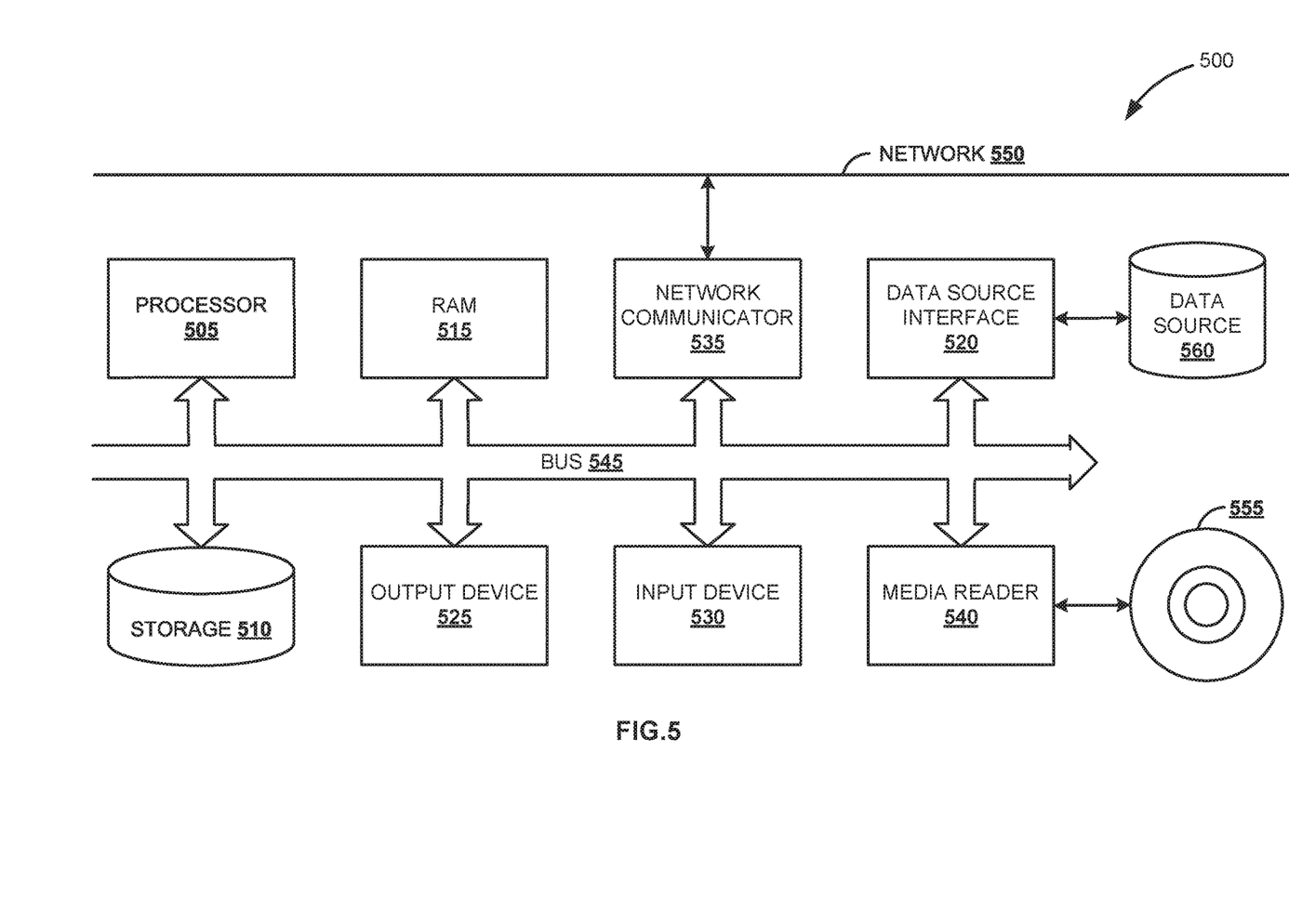
FIG. 5 is a block diagram illustrating an exemplary computer system, according to an embodiment.

FIG. 5 is a block diagram of example computer system 500, according to an embodiment. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. One or more of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments, the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system. XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to perform operations comprising:
retrieving an encryption time frame to encrypt data associated with a user in a multi-tenant cloud environment;
identifying a list of object types, associated with the user, to be encrypted based on the encryption time frame;
determining a batch encryption period for encrypting data corresponding to the list of object types;
sequentially select batches based on the batch encryption period; and
for a selected batch:
retrieving one or more data records based on the batch encryption period; and
encrypting the one or more data records in groups based on at least one throttling value,
wherein the at least one throttling value comprises at least one of a group size and a sleep time, and
wherein the group size and the sleep time are determined by:
receiving a plurality of pre-defined throttling values for encrypting the one or more data records corresponding to the batch;
determining whether encryption is a first run; and
rendering default throttling values from the plurality of pre-defined throttling values of the group size and the sleep time for encrypting the one or more data records in the first run.

2. The non-transitory computer-readable medium of claim 1, wherein when the encryption is a subsequent run, determining the group size and the sleep time based on the pre-defined plurality of throttling values and current system load factors.

3. The non-transitory computer-readable medium of claim 2, wherein the current system load factors comprise at least one of a time taken for encrypting the one or more data records of a previous group, a central processing unit (CPU) load during encrypting the one or more data records of the previous group, and a memory load.

4. The non-transitory computer-readable medium of claim 1, the operations further comprising causing the computer to update status tables upon encrypting the one or more data records of the batch.

5. The non-transitory computer-readable medium of claim 1, the operations further comprising causing the computer to encrypt data corresponding to multiple users opted in for data encryption based on a number of users opted in for the data encryption, an amount of data intended to be encrypted and priority for encrypting the data.

6. A computer implemented method to provide data encryption, comprising:
retrieving an encryption time frame to encrypt data associated with a user in a multi-tenant cloud environment;
identifying a list of object types, associated with the user, to be encrypted based on the encryption time frame;
determining a batch encryption period for encrypting data corresponding to the list of object types;
sequentially selecting batches based on the batch encryption period; and
for a selected batch:
retrieving one or more data records based on the batch encryption period; and
encrypting the one or more data records in groups based on at least one throttling value,
wherein the at least one throttling value comprises at least one of a group size and a sleep time, and
wherein the group size and the sleep time are determined by:
receiving a plurality of pre-defined throttling values for encrypting the one or more data records corresponding to the batch;
determining whether encryption is a first run; and
rendering default throttling values from the plurality of pre-defined throttling values of the group size and the sleep time for encrypting the one or more data records in the first run.

7. The computer implemented method of claim 6, wherein when the encryption is a subsequent run, determining the group size and the sleep time based on the pre-defined plurality of throttling values and current system load factors.

8. The computer implemented method of claim 7, wherein the current system load factors comprise at least one of a time taken for encrypting the one or more data records of a previous group, a central processing unit (CPU) load during encrypting the one or more data records of the previous group, and a memory load.

9. The computer implemented method of claim 6, further comprising updating status tables upon encrypting the one or more data records of the batch.

10. The computer implemented method of claim 6, wherein the one or more data records associated with the user are segregated into different object types and the object types comprise one or more tables to store the one or more data records.

11. A computing system to provide data encryption, comprising:
at least one processor; and
one or more memory devices communicative with the at least one processor, wherein the one or more memory devices store instructions to:
retrieve an encryption time frame to encrypt data associated with a user in a multi-tenant cloud environment;
identify a list of object types, associated with the user, to be encrypted based on the encryption time frame;
determine a batch encryption period for encrypting data corresponding to the list of object types;
sequentially select batches based on the batch encryption period; and
for a selected batch:
retrieve one or more data records based on the batch encryption period; and
encrypt the one or more data records in groups based on at least one throttling value,
wherein the at least one throttling value comprises at least one of a group size and a sleep time, and
wherein the group size and the sleep time are determined by:
receiving a plurality of pre-defined throttling values for encrypting the one or more data records corresponding to the batch;
determining whether encryption is a first run; and
rendering default throttling values from the plurality of pre-defined throttling values of the group size and the sleep time for encrypting the one or more data records in the first run.

12. The computing system of claim 11, wherein when the encryption is a subsequent run, determining the group size and the sleep time based on the pre-defined plurality of throttling values and current system load factors.

13. The computing system of claim 12, wherein the current system load factors comprise at least one of a time taken for encrypting the one or more data records of a previous group, a central processing unit (CPU) load during encrypting the one or more data records of the previous group, and a memory load.

14. The computing system of claim 11, further comprising updating status tables upon encrypting the one or more data records of the batch.

* * * * *